United States Patent
Lakshmi Narayanan et al.

(10) Patent No.: US 7,441,035 B2
(45) Date of Patent: Oct. 21, 2008

(54) RELIABLE SERVER POOL

(75) Inventors: Ram Gopal Lakshmi Narayanan, Woburn, MA (US); Senthil Sengodan, Burlington, MA (US)

(73) Assignee: Nokia Corporation, Espoo (FI)

( * ) Notice: Subject to any disclaimer, the term of this patent is extended or adjusted under 35 U.S.C. 154(b) by 771 days.

(21) Appl. No.: 10/357,508

(22) Filed: Feb. 4, 2003

(65) Prior Publication Data

US 2003/0220990 A1 Nov. 27, 2003

Related U.S. Application Data

(60) Provisional application No. 60/361,596, filed on Mar. 4, 2002.

(51) Int. Cl.
G06F 15/177 (2006.01)
(52) U.S. Cl. .................................................. 709/227
(58) Field of Classification Search ................ 709/203, 709/224, 227, 229
See application file for complete search history.

(56) References Cited

U.S. PATENT DOCUMENTS

| | | | |
|---|---|---|---|
| 6,526,432 B1 * | 2/2003 | Briskey et al. .............. | 709/201 |
| 6,542,929 B1 * | 4/2003 | Briskey et al. .............. | 709/223 |
| 6,859,830 B1 * | 2/2005 | Ronneburg et al. ......... | 709/224 |
| 7,082,604 B2 * | 7/2006 | Schneiderman ............. | 718/100 |
| 2003/0126202 A1 * | 7/2003 | Watt ............................ | 709/203 |
| 2004/0151111 A1 * | 8/2004 | Yarroll et al. ............... | 370/216 |

FOREIGN PATENT DOCUMENTS

EP 1 058 444 A2 6/2000

OTHER PUBLICATIONS

Aalto, Olli: "Reliable Server Pooling", Nov. 9, 2001, University of Helsinki, Department of Computer Science, XP002248281.
Ram, Gopal, Senthil Sengodan, (Nokia): "End Name Resolution Protocol Candidate" (ENRP), Internet Draft, Jul. 10, 2001, IETF <draft-gopal-enrp-candidate-00.txt>, XP004448282.
Ram, Gopal, Senthil Sengodan, (Nokia): "Aggregate Server Access Protocol Candidate" (ASAP), Internet Draft, Jul. 10, 2001, IETF <draft-gopal-asap-candidate-00.txt>, XP002248283.
Q. Xie (Motorola), R. R. Stewart (Cisco Systems): "Endpoint Name Resolution" (ENRP), Internet Draft ,Jun. 1, 2001, IETF<draft-ietf-rserpool-enrp-00.txt>, XP002248284.

* cited by examiner

*Primary Examiner*—Kenneth R Coulter
(74) *Attorney, Agent, or Firm*—Squire, Sanders & Dempsey L.L.P.

(57) ABSTRACT

A method and system for adding and monitoring a server to an existing server pool are disclosed. A joining server registers with a server within the server pool. The joining server is authenticated by a server within the server pool. When the joining server receives the list of all active servers within the server pool, the joining server computes a new identification for itself, assigns that identification to itself, and then determines a caretaker server to monitor the joining server. Once the registration is successful, the newly joined server can communicate within the server pool and keep current of all events and changing conditions of the server pool.

56 Claims, 8 Drawing Sheets

RELIABLE SERVER POOL

This application claims priority to provisional U.S. application Ser. No. 60/361,596, filed Mar. 4, 2002.

FIELD OF THE INVENTION

This invention relates generally to server pooling. More specifically, the invention relates to providing reliable server pooling for network applications.

BACKGROUND OF THE INVENTION

Since the advent of the Internet and network communication capabilities, users have come to expect that information and communication services are constantly available for personal access. People want fast, reliable access to information. In addition, most commercial users depend upon having Internet connectivity all day, every day of the week, all year long. To provide this level of reliable service, component and system providers have developed many proprietary solutions and operating-system-dependent solutions intended to provide servers having high reliability and constant availability.

The rapid expansion of wireless technology and the adoption of Internet Protocol (IP) in telecommunication networks and wireless infrastructures require that IP service be both reliable and available. One aspect of reliability is maintenance of the actual condition of the telecommunication network and each of the elements with the network to ensure that as many elements of a system know the active status of other elements. A telecommunication network is dynamic as elements enter and leave, information is processed, and applications are modified.

Existing services, such as Domain Name Service, and similar other network level look-up services do not reflect the actual condition of the network or network elements. When a user queries a Domain Name Service by providing a name, the Domain Name Service server returns one or more IP addresses. The client caches the returned Domain Name Service entries and forwards the request to the server. Yet, the Domain Name Service configuration is static and does not reflect the current state of the respective servers.

It is not practical to incorporate such dynamic functionality to the Domain Name Service server as the Domain Name Service entries have grown to a large number. Moreover, it may not be possible to monitor all the application servers in the Internet. If this monitoring system were attempted, the entire Internet would be inundated with a high volume of unnecessary traffic. Additionally, as to security issues, an intruder can generate false status data for queried elements. As can be appreciated by one skilled in the relevant art, new services are constantly being provided. These services need the correct current status of the related application server in order to provide uninterruptible real time service to clients. One such new service is a reliable server pool. The reliable server pool is a framework where different servers co-operatively form a pool to support a variety of clients in the supported network. However, the scope of the reliable server pool is typically not Internet-wide, a feature that restricts clients and application servers to one single administrative domain.

In a client-server environment, clients may access an application via one or more servers. In order to provide uniform access to the application through different servers and to evenly balance the load across the servers, there are known network configurations incorporating server load balancer, load sharing, and fault-tolerant systems. Equipment like load balancers perform proxy service to one or more servers in a server pool. The load balancers forward each client request to an available, i.e., less loaded, server. While these solutions are intended to improve the availability of the server itself, the client is still required to access a look-up service, such as Domain Name Service, to locate these servers. The Domain Name Service only performs simple name to address translation based on the static configuration and does not reflect the actual status of the located server. Further, load balancers are not a cost effective solution for all server pool systems.

For example, a particular server might have been down or had its IP address reconfigured for maintenance reasons. Clients that had previously cached the old entries that try to access these services will receive an error message from the network. This impacts both the user and the service provider. As Internet Protocol has been adopted by wireless and telecommunication industries, more services are expected in the near future with corresponding requirements for high availability. Further, there will be even more need for high reliability. Service providers need reliable service to compete.

As the number of static and mobile clients increases to access a particular service from a particular server, two fundamental problems result. First, if the application server goes down or if a node fails, service will not be available. Second, if the network connection between the user and the server has failed, the service will not be available to the user.

When a server fails, or otherwise becomes unavailable, the browser of the user may handle the task of switching to another server to continue an application service. Often, the browser will merely return an error message such as 'URL not found.' Alternatively, if the browser does access a replacement server, there are no considerations given to load sharing. Thus, there is a need to provide a reliable look-up service that both a user and server can use to improve their performance. Reliable Server Pool (Rserpool) is a known architectural framework that addresses these issues and it is being standardized within the Internet Engineering Task Force (IETF).

The present state of the art has defined an improved architecture in which a collection of application servers providing the same functionality are grouped into a reliable server pool to provide a high degree of redundancy. Each server pool is identifiable in the operational scope of the system architecture by a unique pool handle or name. A user or client wishing to access the reliable server pool will be able to use any of the pool servers by conforming to the server pool policy.

Several solutions have been proposed to address the issue of reliability and to ensure a distributed load across a server pool. One such solution is with the use of load balancers. One or more load balancers may be used, whereby selected application services are executed using multiple servers. The load balancer acts as mediator to direct different client requests to different actual servers, thus evening out traffic across all servers. However, the load balancer serves as a single point of failure. The application service may be physically distributed and similar hardware may be deployed so as to avoid a single point of failure configuration. However, this solution may be too costly for many network service providers. Redundant load balancers may be implemented to attempt to alleviate the single point of failure problem; however, any redundant load balancer must be connected to the same local area network segment as the first load balancer. Further, redundant load balancers increase the cost of the system, which again may not be the most suitable solution in every server pool system.

Moreover, there are different variations of load balancers, and each of them is tailored to solve specific application needs or network needs. These 'middle-boxes' may function at any of layer 2, layer 3, or layer 4 of the 7-layer Open Systems Interconnection (OSI) network model. Most middle-boxes provide availability to the client, but only if the client has already resolved the server IP address or if the client already knows the server location. Within the Internet, large content providers typically use such servers and each client must go through the Domain Name Service to perform initial address look-up. When the Domain Name Service returns a list of IP addresses, the client usually tries the first IP address and, if it is unavailable, an error message is returned. The next IP address in the list is not usually tried as a follow-up. The operation of attempting a connection to another IP address on the list is application dependent. For an application that uses Transmission Control Protocol (TCP), as per IETF standards, the number of connection attempts is eight. This situation can be avoided if the content provider binds its IP addresses to the same server(s), but this increases the traffic and load on the servers and this configuration provides no security mechanism.

In another approach commonly used in a distributed application, Common Object Request Broker Architecture (CORBA) middleware provides access transparency. CORBA is a middleware. It is a set of services that is developed by the Object Management Group. It is based on Object model and supports plug-able services, fault tolerance, and availability as part of a base communication mechanism. Different applications can use this to service the client request. Different mechanisms can be supported where non-CORBA applications (client or server) can access CORBA services using Interoperable Object References (IOR). The basic disadvantages of using CORBA are that not all applications need to have such high processing middleware and that there are interoperability problems in adopting CORBA middleware to Internet applications. COBRA is a standard and each vendor implements it in their own manner, requiring a great deal of message exchange.

Candidate Endpoint Name Resolution Protocol (C-ENRP) is a known protocol designed to provide a fully distributed fault-tolerant real-time translation service that maps a name to a set of transport addresses pointing to a specific pool of networked communication endpoints registered under that name. C-ENRP employs a client-server model with which an ENRP server will respond to the name translation service requests from endpoint users running on the same host or different hosts. However, an ENRP server pool system does not currently allow for a change to the load distribution among members of an ENRP server pool when one or more ENRP servers enter or leave the existing ENRP server pool. Further still, a current ENRP server pool system does not allow for each server within the existing ENRP server pool to know the current status of pool endpoints and other ENRP servers within the pool without a single point of failure.

Thus, it would be an advancement in the art to provide a cost effective solution that allows a network server to be added or deleted from a server pool, such as an ENRP server pool, while allowing for a change in the distribution of the application servers' handles by the various network servers in the pool. It would be a further advancement in the art to provide a solution that minimizes traffic and load on the servers while removing the single point of failure problem associated with a load balancer. It would be another advancement in the art to provide a solution incorporating a security mechanism.

BRIEF SUMMARY OF THE INVENTION

To overcome limitations in the prior art described above, and to overcome other limitations that will be apparent upon reading and understanding the present specification, the present invention is directed to methods and systems for monitoring and adding a new server to a server pool. Further, as will be apparent upon reading and understanding the present specification and drawings, examples are illustrated with Endpoint Name Resolution Protocol (ENRP) servers and an ENRP server pool.

A first aspect of the invention provides a method for adding a new server to a server pool. The new server can obtain a list of active servers, select a particular server within the server pool, and send a registration request to the selected server. Thereafter, the new server can compute a new identification for itself to be known and seen in the server pool. It can assign the new identification to itself and determine a caretaker server to monitor its activities, such as a failure or deregistration.

A second aspect of the invention provides a method for adding a new server to a server pool when two or more servers attempt to join the server pool within a very short timeframe. A caretaker server that is contacted by both servers attempting to join the server pool will assume the caretaker role for the first server to request the caretaker server and the caretaker server will notify the second server to request the caretaker server that the registration with that particular caretaker server failed.

The methods may be embodied within a pool element, a pool user, or a server. Additionally, the methods may be embodied within a computer readable medium.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention. Further, the following description and accompanying drawings illustrate the present invention with reference to Endpoint Name Resolution Protocol servers and an Endpoint Name Resolution Protocol server pool. It is understood by those in the art that the present invention is not limited to Endpoint Name Resolution Protocol technology and that the present invention could be utilized within a variety of server pool systems.

Architecture Overview

Figure 1:
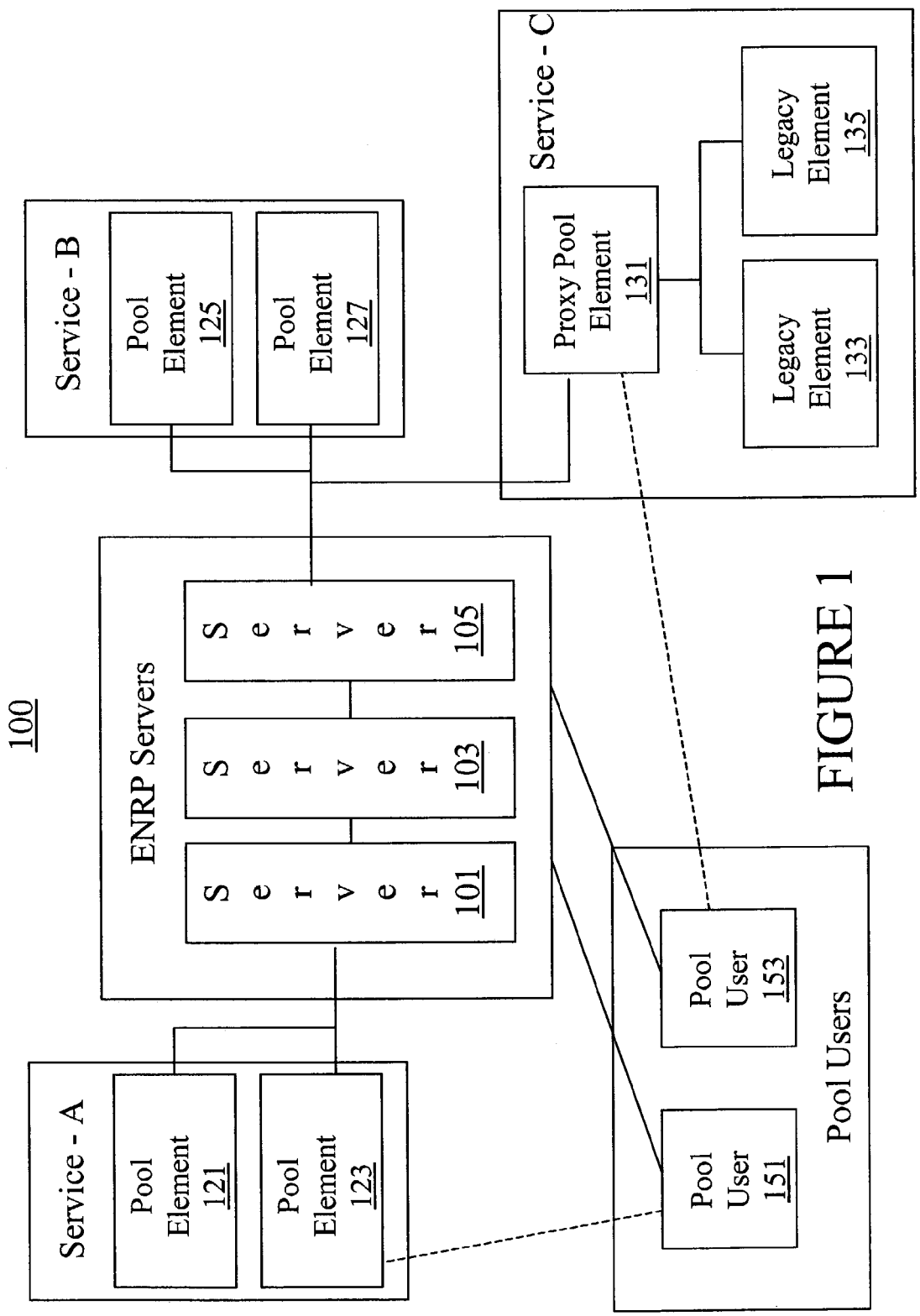
FIG. 1 illustrates a simplified functional block diagram showing a reliable server pool architecture according to an illustrative embodiment of the invention.

FIG. 1 illustrates a reliable server pool system 100 including a plurality of Endpoint Name Resolution Protocol (ENRP) servers 101, 103, and 105, a plurality of pool elements (PE) 121, 123, 125, and 127, a proxy pool element (PPE) 131, legacy servers 133 and 135, and pool users (PU) 151 and 153. Pool elements may include any application program running on distributed host machines, collectively providing the desired application services via, for example, data sharing and/or load sharing. The reliable server pool system 100 provides reliable name translation look-up service to authorized clients, such as the pool users 151 and 153, in one administrative domain. One aspect is to make these servers and clients a thin application by using the existing deployed protocols. Less code is needed to implement the intended functionality and usage of memory and a central processing unit (CPU) is minimized in executing the code. There are no major changes required to incorporate the server protocols. Existing applications can be migrated easily to a reliable server pool by use of an application library. The reliable server pool system 100 comprises a set of protocols, which are used by application services to register themselves to become part of the reliable server pool system 100. Users can get the location of the application servers by making a query to the ENRP server 101, 103, or 105.

The reliable server pool system 100 is similar to a server farm in a web-based environment where an application with a same name and service can register with the ENRP server 101, 103, and 105. The ENRP server 101, for example, groups such application registration requests in one pool name and applies policies evenly to those pool elements. An application or a pool element, such as pool element 121, can register with the ENRP server 101 by specifying an end name and an end point handle. The end name is a string of characters describing the name of the application or Universal Resource Locator (URL) or any arbitrary string that is meaningful for the client. The end point handle is a list of transport endpoint and port numbers on which the pool element 121 can service the client request.

The ENRP servers 101, 103, and 105 can be fault-tolerant name servers, which may support simple flat name space and provide lookup service similar to a Domain Name Service in the reliable server pool system 100. A difference from a Domain Name Service is that the ENRP servers 101, 103, and 105 return a list of servers that are active and operational. The pool users 151 and 153 are the clients of the reliable server pool system 100, which access the ENRP servers 101, 103, and 105 to resolve the name. The pool clients 151 and 153 have thin Application Programming Interface (API) layers, which hide the communication between different ENRP servers and pool elements. The responsibility of APIs include translating network specific information to application specific codes and providing session and caching for PE identities.

The ENRP servers 101, 103, and 105 provide name translation service to the pool clients 151 and 153. As illustrated, the pool elements 121 and 123 are registered under the same pool name 'Service-A' and the pool elements 125 and 127 are registered under the pool name 'Service-B.' The proxy pool element 131 is not strictly a pool element but is used to migrate the legacy servers 133 and 135, registered under the pool name 'Service-C,' into the reliable server pool system 100. That is, proxy pool element 131 provides a layer of software abstraction between the legacy servers and the server pool system.

The ENRP servers 101, 103, and 105 provide basic name translation services to the pool users 151 and 153 by maintaining active lists of the pool elements 121, 123, 125, and 127. As shown in the protocol stack diagram of FIG. 2, ENRP servers communicate with each other using C-ENRP (Candidate Endpoint Name Resolution Protocol) layers. For example, the ENRP servers 101 and 103 communicate using C-ENRP via a communication link 281. There may be more than one ENRP server in a reliable server pool system. On the other hand, the ENRP servers use C-ASAP (Candidate Aggregate Server Access Protocol) layers to communicate with other pool elements and with pool users. For example, the ENRP server 101 communicates with the pool element 123 using C-ASAP via a communication link 283, and the ENRP server 103 communicates with the pool user 153 using C-ASAP protocol via a communication link 285. The ENRP servers retain information regarding the legacy servers 133 and 135, but communicate via the proxy pool element 131 and not directly with the legacy servers 133 and 135.

Figure 2:
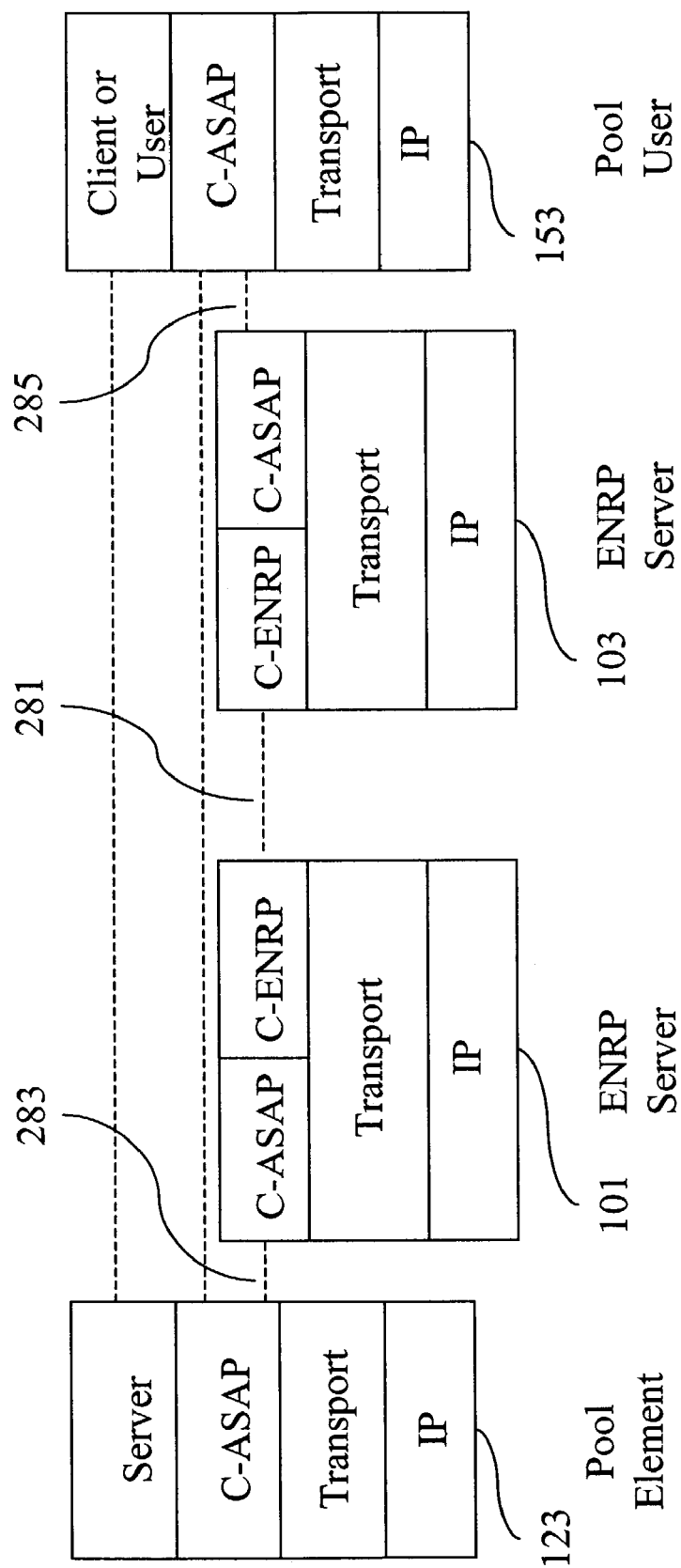
FIG. 2 illustrates a diagrammatical illustration of a reliable server pool protocol stack according to an illustrative embodiment of the invention.

As shown in FIG. 2, the protocol stack of reliable server pool protocol disclosed herein, including both C-ENRP and C-ASAP, uses an underlying transport mechanism. Accordingly, these protocols have very small foot-prints on the clients and can be advantageously implemented in physically small devices such as mobile telephones.

The pool elements 121, 123, 125, and 127 are typically application servers and can register to any one of the ENRP servers 101, 103, and 105 in the reliable server pool system 100. The pool elements 121, 123, 125, and 127 initially obtain the list of the ENRP servers 101, 103, and 105 by making a query to a Domain Name Service server (not shown) or by another configuration known in the relevant art. During the registration process, each of the pool elements 121, 123, 125, and 127 can specify a pool name under which it wants to register. Application characteristics including a load parameter, a time for which the pool element is to be active in the reliable server pool system 100, and/or other service control parameters may also be specified during the registration process. The ENRP server 101, 103, and 105 add an entry into its database after validating the selected pool name and pool handle, and each ENRP server 101, 103, and 105 can update all other ENRP servers upon completion of its registration process.

If more than one pool element registers under the same name, the respective ENRP server will apply the load characteristics for that pool based on the first pool element or it can resolve dynamically based on the ENRP server configuration. The pool element is referenced by the end name in the reliable server pool system 100 and is unique for one operational scope. After successful registration, the pool element may get a client request and can serve the client. At any given point, the pool element can deregister itself from the pool, for example, because maintenance is scheduled to occur on the pool element. The pool element may periodically send its dynamic load changes as part of update messages. The ENRP server continues to update this information and when a new client queries the ENRP server, this updated information is returned to the pool user. The reliable server pool system 100 provides a basic framework and supports basic load scheduling mechanisms to balance traffic between pool elements associated with the same service.

There may be situations in which the pool element is idle and provides no change in load. Under this situation there might be no message exchanges between the pool element and the respective ENRP server. However, the ENRP server needs to know the status of the application and may send a periodic health check message to ensure that the pool element is operational and active in the pool.

The following are examples of the types of messages that can be exchanged between a pool element and an ENPR server: a pool element registration request/reply; a pool element deregistration request/reply; a pool element update request/reply; and a health check request/reply. Each example message is described in further detail, below.

A pool user refers to any client of the reliable server pool system 100. When contacting the ENRP servers 101, 103, and 105, a client initially obtains a list of ENRP servers in the reliable server pool system 100. This can be done by a simple Domain Name Service query or some other configuration mechanism. The client queries one of the ENRP servers 101, 103, and 105 to resolve the pool element names. The client may receive more than one pool handle if there is more than one pool element in a pool.

A pool user can communicate to a pool element after receiving a valid pool element handle. The pool user can support client-side caching to avoid repeated queries to the respective ENRP server. This is used only if the client is sure of the pool element availability. In the reliable server pool system 100, the load balancing across pool elements may be done by the pool user and not by the respective ENRP server. After receiving the list of endpoint handles, the pool user has to compute the next available pool element before each transaction. To achieve proper load balancing across pool elements, the pool user has to disable the client-side caching and preferably makes queries to the respective ENRP server before making each transaction. In this way, the ENRP server can return a list of pool elements including recent load characteristics. Accordingly, the pool user's message exchanges may be increased.

The following are examples of the types of messages which can be exchanged between a pool user and an ENPR server: a get list of IP-address by end-name message; a get list of end-name by IP-address message; and a get list of ENRP servers message. Each example message is described in further detail, below.

Both C-ENRP and C-ASAP are text-based protocols and both incorporate the ISO 10646 character set in UTF-8 encoding. Preferably, a sender terminates lines with a carriage return (CR)/line feed (LF) and receivers interpret a CR or a LF as a line terminator.

An ENRP or ASAP message is usually either a request from a client to a server, or a response from a server to a client. An example of such a message follows:

*ASAP/ENRP*-message=Request|Response

Preferably, both the request message and the response message use the generic message format disclosed in IETF Request for Comments 822, August 1982. Both types of messages include a start-line, one or more header fields (also known as 'headers'), an empty line (i.e., a line with nothing preceding the carriage-return line-feed) indicating the end of the header fields, and an optional message-body. In way of example, the following lines illustrate the format of an ENRP/ASAP message:

ASAP/ENRP-message=start-line
*message-header
CRLF
[message-body]
[empty line]
start-line=Request-Line|Status-Line Protocol Operation A description of the different protocol messages and a typical startup sequence for the ENRP servers 101-105 are provided in greater detail below. The ENRP servers 101-105 cooperate (and are synchronized) with one another, and operate within an operational scope. For example, assume a situation where four IP addresses, IP1-IP4, to four different ENRP servers are registered under a DNS. If an ENRP server is started first, such as the server with address IP2, it attempts to send a message to address IP1 and waits for a reply. Since there is no active server with address IP1, it next tries ENRP server with address IP3 and then ENRP server with address IP4. Once the list is complete, the ENRP server with address IP2 assumes that it is the first starting server. If any pool element tries to register with an ENRP server, the registration message is sent to ENRP server with address IP2. If ENRP server with address IP3 is later started, it attempts to contact address IP1 first and then address IP2. Since the ENRP server with address IP2 is active, it sends a response to ENRP server with address IP3. At this point, ENRP server with address IP2 uploads the status of ENRP server with address IP3 in order to synchronize with it. After the database upload, both ENRP servers with addresses IP2 and IP3 contain the same data and keep track of the registered servers (PEs) and also poll each other periodically.

Preferably, there is more than one ENRP server in an operation scope to form the reliable server pool system 100 to provide for availability. The ENRP servers 101-105 cooperate with each other and thus synchronize themselves. Accordingly, the reliable server pool system 100 can handle the case of ENRP server failures and can distribute the application load among the ENRP servers. Further, load sharing of health check monitoring functions of PEs can also be done (i.e., health check messages). Load sharing may be done for pool user queries to the ENRP servers 101-105. The pool users might not know the list of active ENRP servers in the operational scope. Their only source of information might be from the Domain Name Service, which may not be up-to-date. In one embodiment, the first time a pool user contacts an ENRP server, the respective ENRP server can download a list of then-currently-active ENRP servers, so that the pool user can use, for example, a registration request policy for subsequent queries to ENRP servers.

In one embodiment, a pool element, a pool user, or an ENRP server first obtains the list of ENRP servers from the Domain Name Service, or from some local configuration setting in order to become a part of the reliable server pool system 100. It should be understood that the list may not be up-to-date, some entries in the list may not be in the ENRP server pool, and/or there may be other ENRP servers in the pool that are not listed in the list. Preferably, the pool element arbitrarily selects one ENRP server and sends the pool element registration request to the selected ENRP server. If a selected ENRP server is not active, another ENRP server can be chosen from the list. Preferably, at least one ENRP server in the list is active in the pool.

Figure 3:
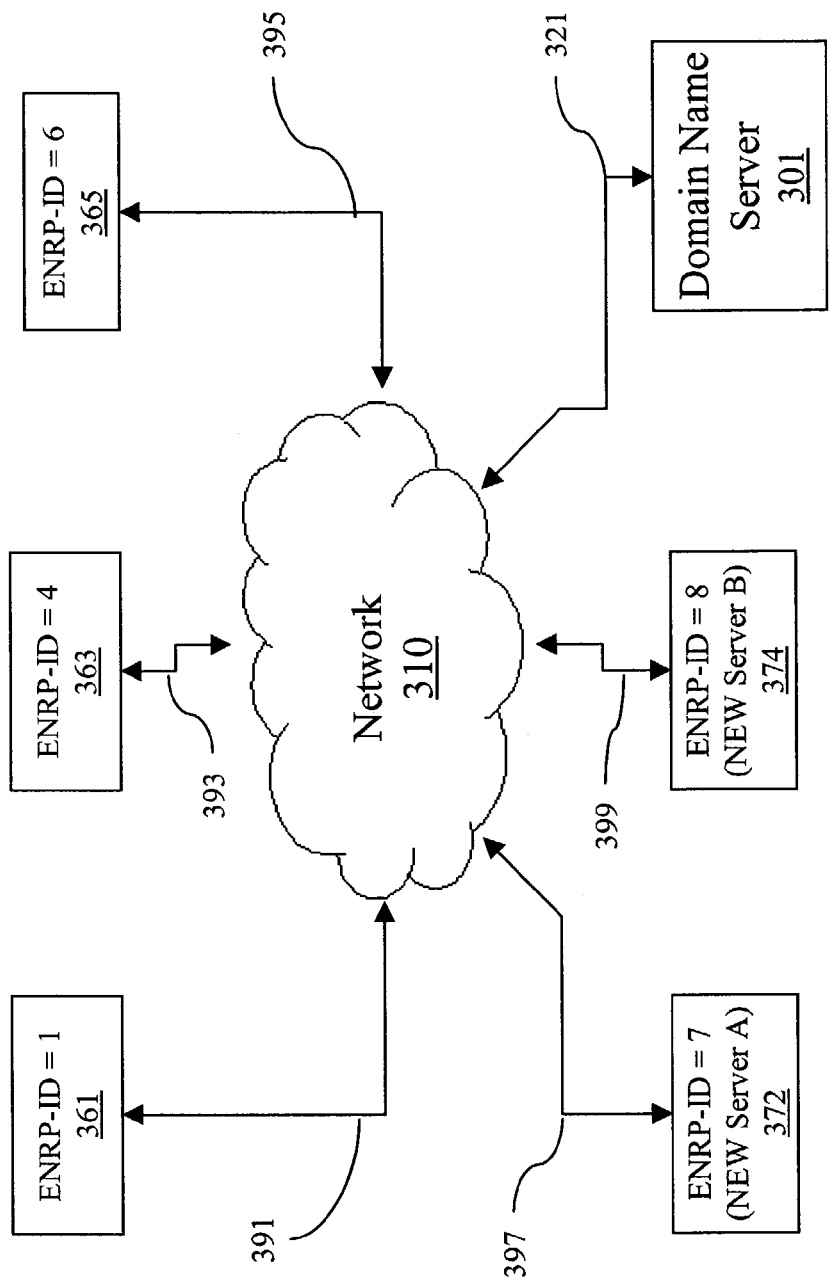
FIG. 3 is a diagrammatical illustration of an Endpoint Name Resolution Protocol server start-up sequence according to an illustrative embodiment of the invention.

For example, FIG. 3 illustrates an example of one embodiment of when one or more ENRP servers, 372 and 374, attempt to join an existing ENRP server pool. FIG. 3 illustrates the communication connections between the different elements. ENRP servers 361, 363, and 365 are part of an existing ENRP server pool. Communication between the ENRP servers 361, 363, and 365 occurs via communication links 391, 393, and 395 respectively. Each ENRP server can communicate to the other via a network 310. It should be noted that the network could comprise a direct connection between any ENRP servers, an array of connections between the ENRP servers, a number of various communication systems, the Internet, or an Intranet, to name just a few. Those skilled in the art appreciate the various mechanisms of communication between ENRP servers.

By way of example, a Domain Name Service 301 is also attached to the communication network 310 via a communication link 321. It should be understood that the Domain Name Service 301 is by way of example and that another type of network level look-up service could be utilized. FIG. 3 also illustrates two new ENRP servers A, 372, and B, 374, attempting to join the existing ENRP server pool. ENRP servers 372 and 374 communicate with the existing ENRP server pool through communication network 310 and via communication links 397 and 399 respectively. It is understood that the existing server pool could comprise more or less than the three ENRP servers provided and at a given time that more than one or two ENRP servers could attempt to join an existing ENRP server pool.

It should be noted that the ENRP servers within the ENRP server pool and the joining ENRP servers shown have numerical gaps between them, illustrative of an example where ENRP servers 2, 3, and 5 have been removed, or removed themselves from the ENRP server pool. Such a situation may occur in the case of scheduled downtime for maintenance on an ENRP server or failure of an ENRP server. Therefore, this numerical situation is only by way of example.

Figure 4:
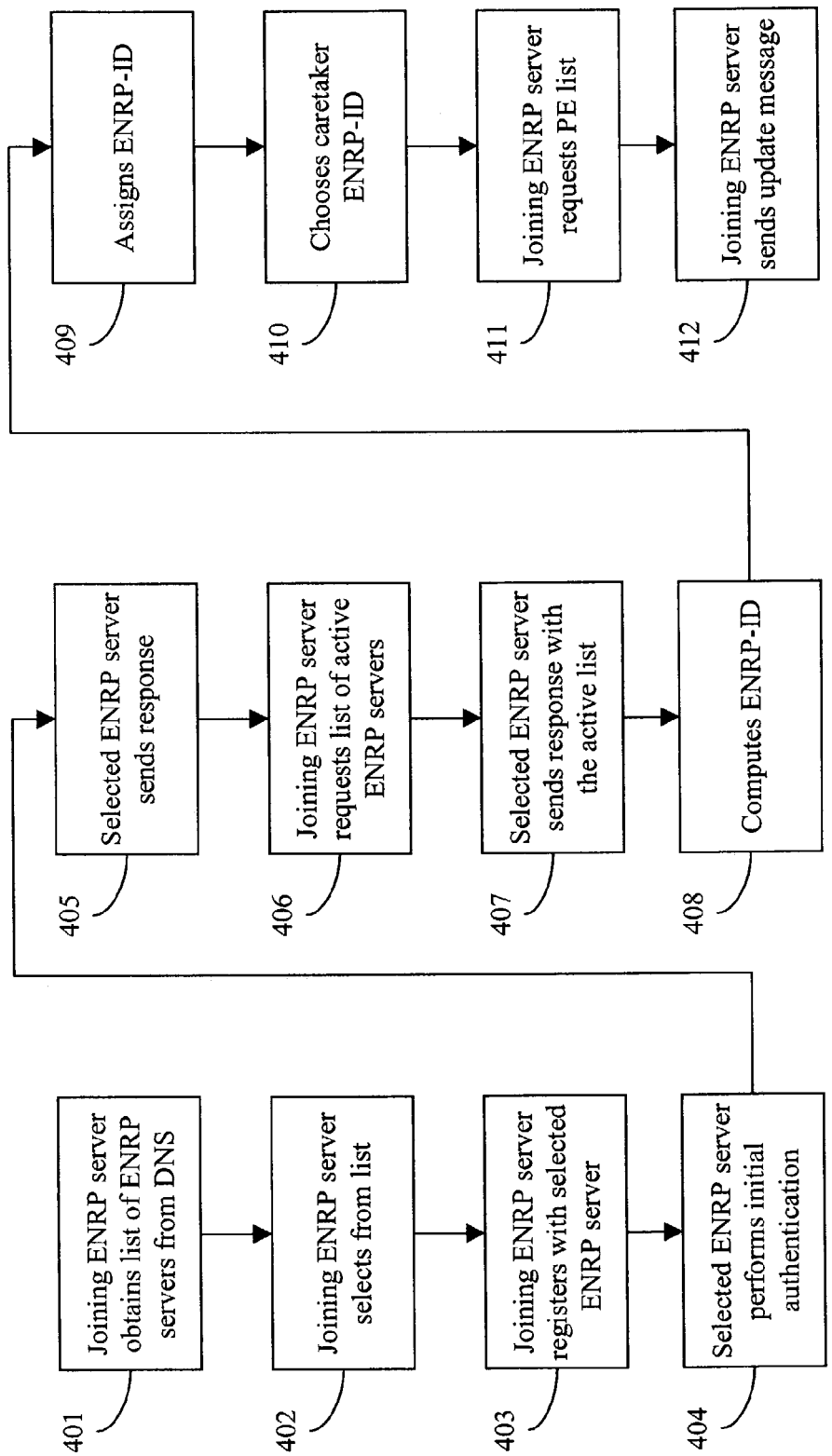
FIG. 4 is a flow chart that illustrates an embodiment of an Endpoint Name Resolution Protocol server start-up sequence according to an illustrative embodiment of the invention.

FIG. 4 illustrates the process in which one ENRP server attempts to join an existing ENRP server pool. At step 401, a joining ENRP server, such as 372 (New Server A) in FIG. 3, obtains a list of ENRP servers, such as 361-365, from a Domain Name Service server, such as 301. It should be noted that the list of ENRP servers may be obtained from another type of network level look-up service and that a Domain Name Service is only shown by way of example. At step 402, the joining ENRP server makes a selection of an ENRP server from the list. This selection could be based upon a predefined protocol for selection or it could be arbitrary. After selecting one ENRP server from the list, for example, the ENRP server 361 (ID=1), at step 403, the joining ENRP server sends an ENRP-REGISTRATION request to the selected ENRP server, in this case ENRP server 361. At step 404, the selected ENRP server performs an initial authentication (depending upon the security protocol) and, at step 405, it sends back an ENRP-REGISTRATION response with a status code, indicative of a result of the initial authorization. For example, if a new ENRP server is authorized to be part of the server pool, the status code may be "ok." If the ENRP server is not authorized to be a part of the pool, a status code may be "unauthorized request" or if an error occurred during authorization, the status code may be "insufficient or improper security parameter." A typical registration request includes 'Expire Time,' 'Service Policy,' and other server specific information. After the ENRP-REGISTRATION response has been sent, at step 406, the joining ENRP server then requests an ENRP server list by sending, to the same selected ENRP server, a DOWNLOAD request to obtain the active list of ENRP servers in the existing ENRP server pool. At step 407, the requested ENRP list is provided in a DOWNLOAD response to the joining ENRP server.

After receiving the ENRP list, the joining ENRP server computes an ENRP-ID at step 408, assigns itself an ENRP-ID at step 409, and determines its caretaker ENRP-ID at step 410. Preferably, there is provided a caretaker ENRP server for each ENRP server in the existing ENRP server pool. A caretaker ENRP server is a regular ENRP server within the ENRP server pool, acting also as backup ENRP server to another ENRP server in the server pool. Each ENRP server has a corresponding caretaker ENRP server for itself. The responsibility of the caretaker ENRP server is to periodically check the availability and status of its corresponding ENRP server and to update the other servers within the ENRP server pool as to the same. With this configuration, not all the ENRP servers need to generate health check messages to the respective pool elements, but all the ENRP servers in the pool are kept current as to the status of pool elements and ENRP servers.

In computing an ENRP-ID, a joining ENRP server may scan through all of the ENRP-IDs in the list of ENRP servers in the ENRP server pool and determine the ENRP-ID with the highest value. The joining ENRP server computes an ENRP-ID for itself by incrementing the ENRP-ID with the highest value by one, for example. After computing the joining ENRP server's ENRP-ID, the joining ENRP server determines its caretaker ENRP server whose ENRP-ID is one less than its own value, for example. For example, the ENRP servers of the ENRP server pool in FIG. 3 are listed in Table 1 and have corresponding ENRP-IDs of '1,' '4,' and '6.' Again, the numerical gaps in the ENRP-ID sequence represent ENRP servers that have gone down either normally, such as a scheduled downtime for maintenance, or abnormally, such as a server failure. Accordingly, if one additional ENRP server joins the reliable server pool system, the ENRP-ID of the joining ENRP server 372 will be the identification '7' and the server selected to be the respective caretaker ENRP server for the joining ENRP server 372 will be ENRP server 365, having identification '6,' as shown in Table 2. It should be understood by those skilled in the art that there are a number of methods for calculation of an ENRP-ID based upon the other ENRP servers within the existing server pool and that these Tables illustrate but one example.

TABLE 1

ENRP Name Server table before Server Name Server ID Selection

| ENRP Server | ENRP-ID | Description |
| --- | --- | --- |
| Server-361 | 1 | Caretaker for ENRP Server 363 |
| Server-363 | 4 | Caretaker for ENRP Server 365 |
| Server-365 | 6 | Caretaker for ENRP Server 361 |
| Server-372 (New) | TBD | Joining ENRP Server |

TABLE 2

ENRP caretaker selection and reassignment

| ENRP Server | ENRP-ID | Description |
| --- | --- | --- |
| Server-361 | 1 | Caretaker for ENRP Server 363 |
| Server-363 | 4 | Caretaker for ENRP Server 365 |
| Server-365 | 6 | Caretaker for ENRP Server 372 |
| Server-372 | 7 | Caretaker for ENRP Server 361 |

Additionally, the joining ENRP server 372 automatically assumes the responsibility of being the caretaker ENRP server to the ENRP server previously held by the caretaker ENRP server of the joining ENRP. By example, as shown in Table 1 above, prior to the joining ENRP server 372 joining the network server pool, Server-365, with an ENRP-ID of 6, was the caretaker ENRP server for ENRP Server 361. Then, as illustrated in Table 2 above, after the new ENRP server, now Server-372 with an ENRP-ID of 7, has calculated an ENRP-ID, it automatically assumes the caretaker role previously held by Server-365. As shown, Server-372 is now the caretaker server for ENRP server 361. This ensures that as a new server is joined to the network pool, each ENRP server has an assigned caretaker server to monitor its status as well as a server for which it is to monitor status. In the example of FIG. 3, this would now mean that ENRP server 372 would have a caretaker ENRP server 365 and would be a caretaker ENRP server for ENRP server 361.

Referring back to FIG. 4, after determining the ENRP-ID and caretaker ENRP server, at step 411, the joining, now registered, ENRP server requests from its caretaker ENRP server a pool element list. Further, at step 412, the joining ENRP server can send an update message to one or more of the ENRP servers within the ENRP server pool indicating that registration of the joining ENRP server is complete.

In another illustrative embodiment, there may occur a situation in which two or more ENRP servers attempt to join the reliable server pool system 100 within a relatively small time frame, obtain identical ENRP server lists, and thereby compute identical ENRP-IDs. An example of such is found in FIG. 5.

Figure 5:
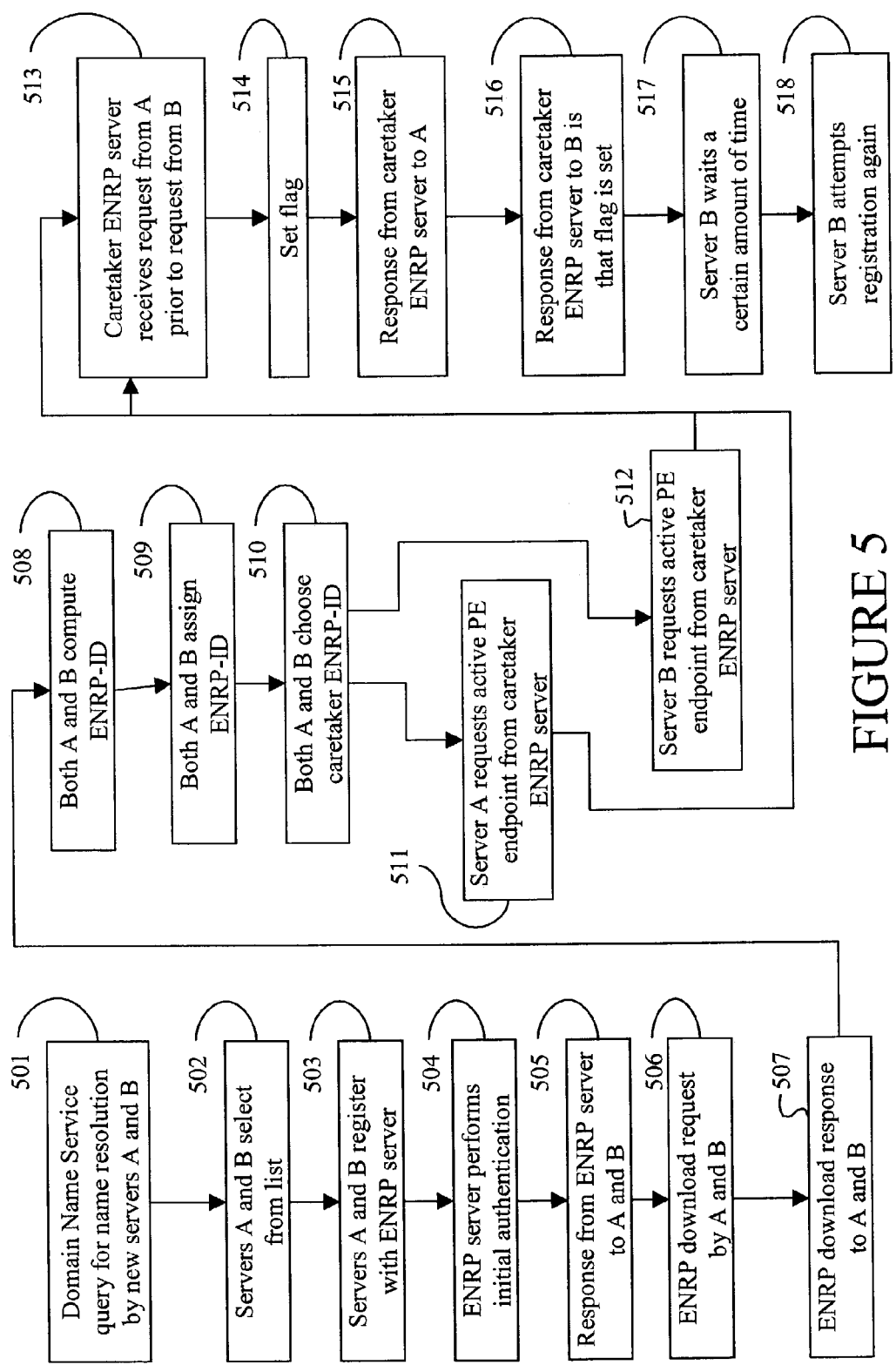
FIG. 5 is a flow chart that illustrates an embodiment of an Endpoint Name Resolution Protocol server start-up sequence to avoid identification collision according to an illustrative embodiment of the invention.

Referring back to FIG. 3, the existing network server pool includes ENRP servers 361, 363 and 365. In FIG. 5, at step 501, two joining ENRP servers, for example ENRP servers 372 and 374, obtain a list of the ENRP servers 361-365 from a Domain Name Service server 301. FIG. 3 shows only one Domain Name Service server for illustrative purposes only. More than one Domain Name Service server could be included. Further, the list of ENRP servers could be obtained from a source other than a Domain Name Service. At step 502, each joining ENRP server selects an ENRP server from the list, for example, the ENRP server 361 (ID=1). It should be noted that the joining ENRP servers could determine the same ENRP server or different ENRP servers from the list. By way of example, in this case, both of the joining ENRP servers select ENRP server 361. Again, this selection could be based upon a predefined protocol for selection or it could be arbitrary. At step 503 the joining ENRP servers 372 and 374 send ENRP-REGISTRATION requests to the selected ENRP server 361.

As already stated above, at step 504 the selected ENRP server, in this case 361, performs an initial authentication (depending on the security protocol) and, at step 505, it sends back the ENRP-REGISTRATION response with a status code. After the ENRP-REGISTRATION response has been sent, at step 506 the joining ENRP servers 372 and 374 then request an ENRP server list by sending a DOWNLOAD request to obtain the active list of ENRP servers in the existing ENRP server pool. At step 507, the requested ENRP list is provided in a DOWNLOAD response to the joining ENRP servers.

After receiving the ENRP list, the joining ENRP servers 372 and 374 compute their ENRP-ID at step 508, assign themselves the ENRP-ID at step 509, and determine a caretaker ENRP-ID at step 510. As explained above, both ENRP server 372 and 374 compute the same ENRP-ID, '7,' and each will assign that ENRP-ID to itself. At step 511, for example, ENRP server 372 requests the active PE list from its computed caretaker ENRP server 365. Concurrently, at step 512, ENRP server 374 requests the active PE list from its computed caretaker ENRP server 365, the same computed caretaker ENRP server for ENRP server 372. In this example, it is assumed, at step 513, that ENRP server 365 received the request for the active PE list from ENRP server 372 prior to receiving the request from server 374. However, the case could arise that ENRP server 365 received the request for the active PE list first from ENRP server 374 or a third or fourth ENRP server (not shown) attempting to join the ENRP server pool.

At step 514, a flag at ENRP 365 is set, representative of the fact that other future requesting ENRP servers need to reregister. At step 515, the active PE list is provided in a response to ENRP server 372. At step 516, the active PE list is not provided in a response to ENRP server 374. Rather a response is sent indicative that the flag is set in ENRP server 365 and that ENRP server 374 must attempt to register again. At step 517, ENRP server 374 waits a predetermined period of time. Upon expiration of that time, at step 518, ENRP server 374 starts the registration process again. During this second registration process, ENRP server 374 computes its ENRP-ID to be '8' as ENRP 372 is now its computed caretaker ENRP server. Therefore, ENRP server 374 requests the active PE list from its caretaker ENRP server 372.

In this example, after ENRP server 372 has successfully updated all other ENRP servers in the pool of its successful registration, the flag at ENRP server 365 is preferably reset. A timer associated with this flag resets the flag if the update does not occur within a certain pre-specified amount of time.

When an existing ENRP server departs the reliable server pool system 100, then the pool elements previously handled by the departing ENRP server need to be redistributed among the other ENRP servers remaining in the reliable server pool system 100. Similarly, when a new ENRP server enters the reliable server pool system 100, the existing load may be redistributed among the ENRP servers in the reliable server pool system 100.

Referring back to FIG. 3, for the case of a newly joined ENRP server, the newly joined ENRP server 372 computes the load redistribution of the pool elements handled, and notifies the other ENRP servers 361-365 in an update message. Alternatively, such notification of the load redistribution may not be made in the update message; rather, each existing ENRP server 361-365 can independently compute the load redistribution (identical to that computed by the new ENRP server 372) upon receiving the update message.

Figure 6:
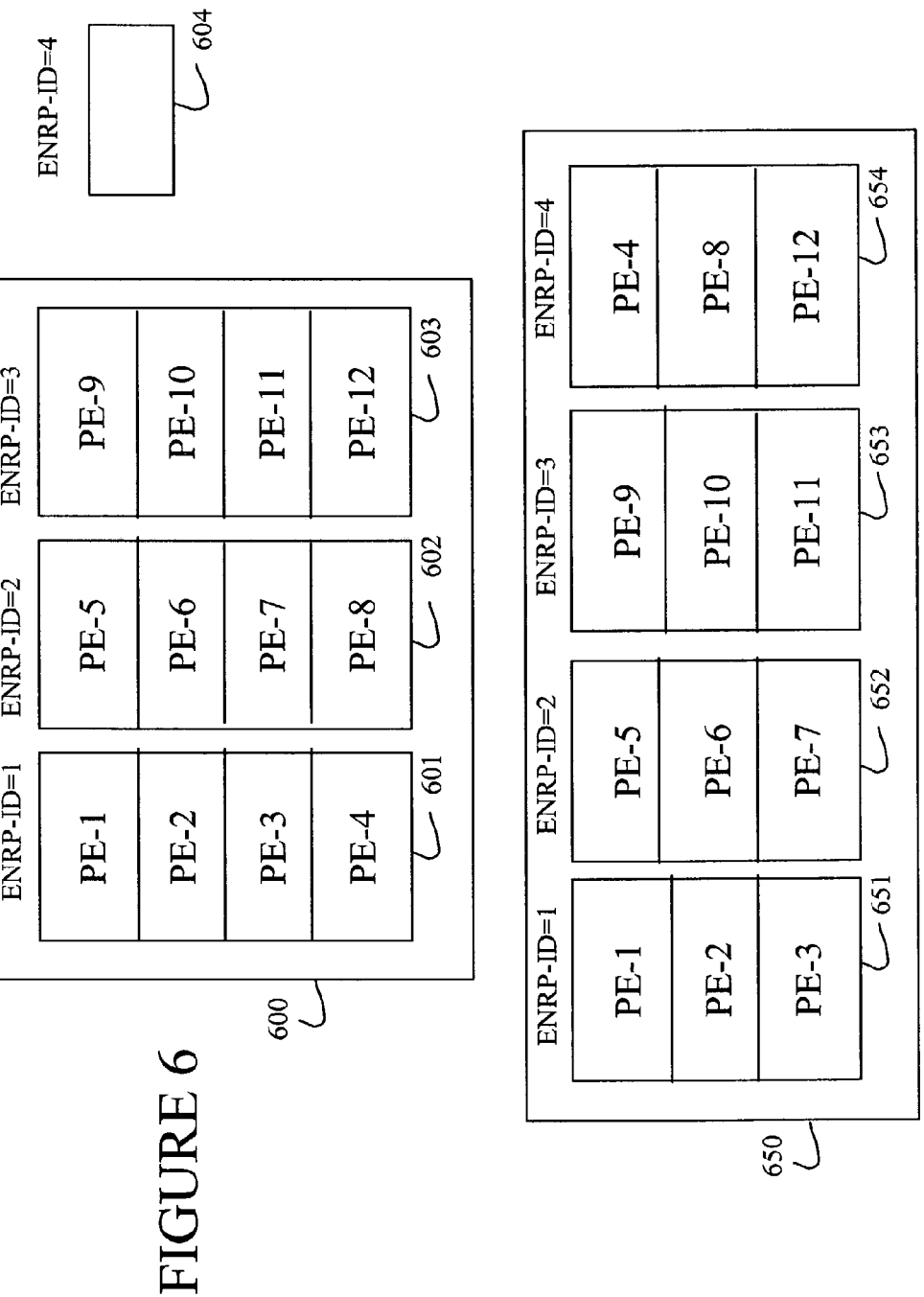
FIG. 6 is a diagrammatical illustration of load redistribution when an Endpoint Name Resolution Protocol server joins an existing server pool.

FIG. 6 illustrates an example of the redistribution of the pool elements load when a new ENRP server joins the server pool. Reference element 600 is an existing network server pool. As described herein, an existing network server pool can be of any number of servers. In this example, existing network server pool 600 includes three ENRP servers: ENRP-ID=1, 601; ENRP-ID=2, 602; and ENRP-ID=3, 603. ENRP-ID=1, 601, is responsible for pool elements PE-1, PE-2, PE-3, and PE-4. ENRP-ID=2, 602, is responsible for pool elements PE-5, PE-6, PE-7, and PE-8. ENRP-ID=3, 603, is responsible for pool elements PE-9, PE-10, PE-11, and PE-12. ENRP-ID=4, 604, has not yet joined the existing network server pool 600. Although not shown in this example, ENRP-ID=4, 604, could be responsible for other pool elements itself.

Once ENRP-ID=4, 654, has successfully joined the existing server pool 650, the load among the four ENRP server has been redistributed. In this example, there are now four ENRP servers in the existing network server pool 650: ENRP-ID=1, 651; ENRP-ID=2, 652; ENRP-ID=3, 653; and ENRP-ID=4,

654. In this example, upon redistribution of the load, each ENRP server within the existing server pool 650, except for ENRP-ID=4, 654, is responsible for one less pool element. ENRP-ID=1, 651, is responsible for pool elements PE-1, PE-2, and PE-3. ENRP-ID=2, 652, is responsible for pool elements PE-5, PE-6, and PE-7. ENRP-ID=3, 653, is responsible for pool elements PE-9, PE-10, and PE-11. Finally, ENRP-ID=4, 654, is now responsible for pool elements PE-4, PE-8, and PE-12. Any number of possibilities could exist for the redistribution of the load and the example illustrated in FIG. 6 is but one example.

For the case where an existing ENRP server fails/leaves, the caretaker ENRP server may compute the load redistribution and notify all other ENRP servers in the pool in the update message. Alternatively, the caretaker ENRP server may not convey the load redistribution in the update message, but only indicate notification of an ENRP server health check failure or a normal shutdown. Based on this notification, each ENRP server can independently compute the same load redistribution.

Further still, any ENRP server may assume the role of a load balancer. The role of the load balancer ENRP server within an existing server pool may change if a new ENRP server joins the server pool or if an ENRP server, whether the ENRP server assuming the role of a load balancer or another ENRP server, fails or leaves the server pool. Multiple ENRP servers within the server pool or joining the server pool may assume the role of a load balancer as well. Particular algorithms, protocols, or standards could be maintained as to which ENRP server(s) assumes the role of a load balancer and what procedures are in place to change the role should a condition of the server pool change, such as a new server joining or an existing server leaving/failing.

Referring again to FIG. 3, after completing the PE download the newly joined ENRP server 372 will send an update message to all the ENRP servers in the pool. Some of the updates take place with the respective ENRP servers and some of the updates are also provided to the pool elements.

Figure 7:
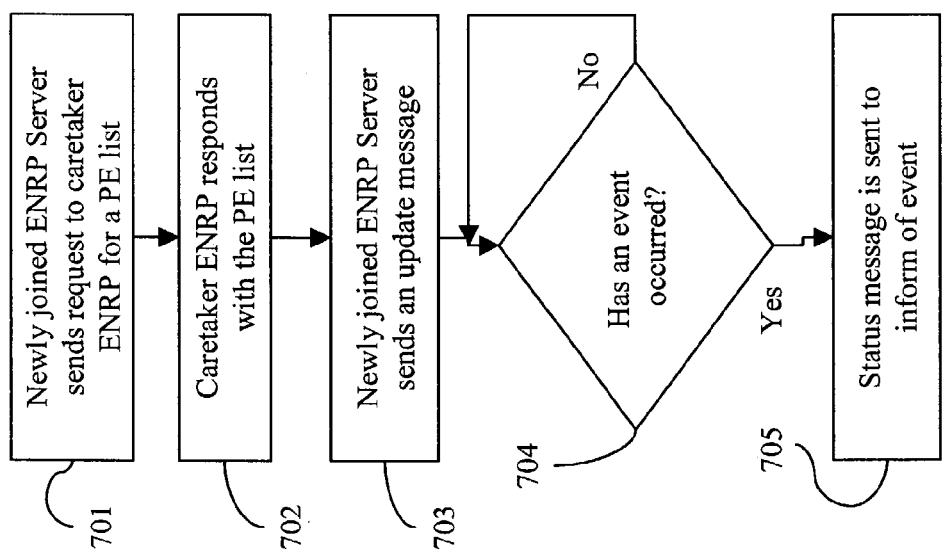
FIG. 7 is a flow chart that illustrates Endpoint Name Resolution Protocol server interaction according to one aspect of the invention according to an illustrative embodiment of the invention.

FIG. 7 illustrates communication between different entities according to one aspect of the invention. It is assumed that a newly joined ENRP server is already registered and has a caretaker ENRP server. At step 701, as already discussed above, the newly joined ENRP sends a request to its caretaker ENRP server for a PE list. The caretaker ENRP server sends the active PE list in a response at step 702. At step 703, the newly joined ENRP server sends an update message. At step 704, a determination is made as to whether an event has occurred /is triggered. If an event has occurred/is triggered, the ENRP servers send status messages to inform one another of the occurring/triggering event at step 705. One such example is after the ENRP registration and the successful download of ENRP and ASAP data, the newly joined ENRP server sends the ENRP update list to other ENRP servers and to the list of ASAP endpoints in the reliable server pool system. A second example is when a caretaker ENRP server sends the ENRP update message due to health check failure or to normal shutdown of the ENRP server. Still another example is when an ENRP server can extend/update its registration with the reliable server pool system by sending an ENRP-UPDATE message. Typical updates could be to extend the expire time or to change the policy and control parameters. Other examples for reasons for messages include when an ASAP server endpoint health check failure occurs, when an ASAP server endpoint is added to the pool, and when an ASAP server endpoint is performing a registration update.

Figure 8:
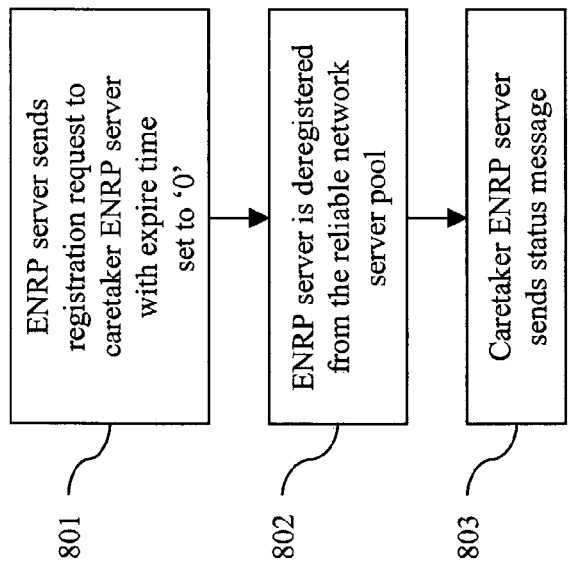
FIG. 8 is a flow chart that illustrates Endpoint Name Resolution Protocol server deregistration according to one aspect of the invention.

FIG. 8 is an illustrative example of one process when an ENRP server deregisters itself from the pool. At step 801, an ENRP server can deregister itself from the reliable server pool by sending an ENRP-REGISTER message with expire timer set to '0' to a corresponding caretaker ENRP server. The ENRP server can also deregister one of its transport addresses if it is multi-homed by setting a corresponding expire value set to '0.' At step 802, the requesting ENRP server is deregistered from the pool. Subsequently, at step 803, the caretaker ENRP server sends a status message regarding the deregistration of the requesting ENRP server.

Figure 9:
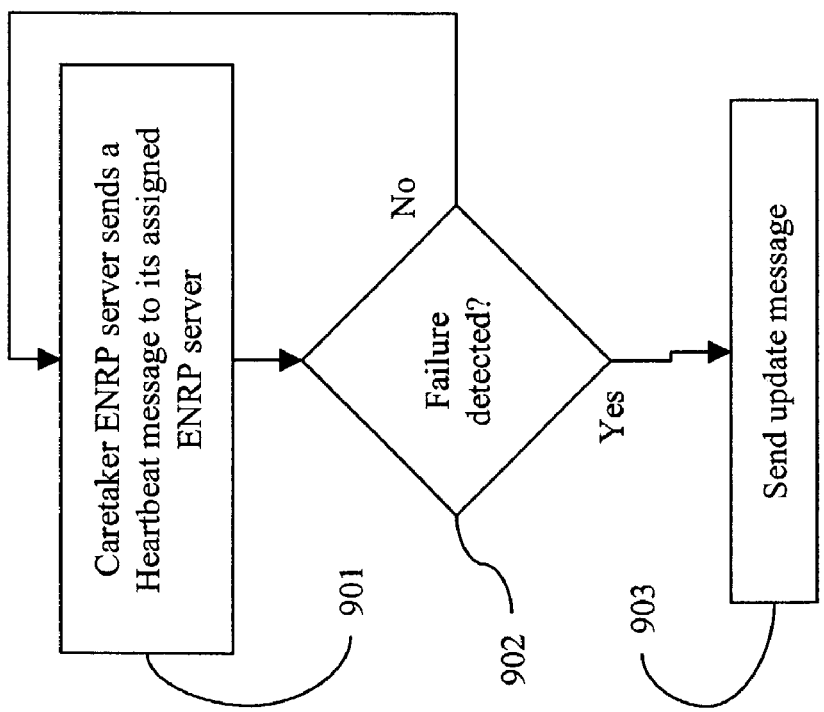
FIG. 9 is a flow chart that illustrates Endpoint Name Resolution Protocol server failure detection according to one aspect of the invention.

A health check is performed to determine whether the respective ENRP server or pool element is still operational. As the states of all ENRP servers are the same in the reliable server pool system 100, each ENRP server has to ensure that all other ENRP servers in the operational scope are active. To do this under the current art, each ENRP server generates a health check message and sends it to all other ENRP servers. In prior known solutions, this complicates the ENRP server operation and increases the number of messages. In one aspect of the present invention however, for each ENRP server there is a caretaker ENRP server, and the health check request is performed during the startup of each respective ENRP server. Thus, each caretaker ENRP server maintains the current status of its corresponding ENRP server and then informs the other ENRP servers in the pool of any changes to the current status. FIG. 9 illustrates an example of a caretaker ENRP server monitoring its corresponding ENRP server. At step 901, the caretaker ENRP server generates a health check message to its assigned ENRP server. Step 902 determines whether a failure is detected. Should a failure be detected, at step 903, the caretaker ENRP server will generate an appropriate update message to the other ENRP servers.

An ENRP server may also check the status of a pool element by periodically generating a health check request message. After the ENRP server has started, each ENRP server computes the load across a particular pool element and assigns to it a primary ENRP server for generating health checks to the subset of pool elements. A pool user (PU) may send a RESOLVE request to one or more ENRP servers. The RESOLVE request contains the pool element end name. Upon receiving the RESOLVE request, the ENRP server creates a list of pool elements based on the policies of each pool element and then sends the list of pool element end point handles to the PU. This message is similar to a Domain Name Service query.

The PE-REGISTRATION method is used within a request message that is sent by a pool element to an ENRP server to indicate a status, such as one of the following: a pool element wishes to join a server pool; a pool element, which has already registered itself with an ENRP server and is currently a member of a server pool, extends/modifies the registration parameters; or an ENRP server which is currently a member of a server pool deletes its registration.

A pool element may cancel an existing registration by sending a PE-REGISTRATION request with an expiration time (i.e., an 'expires' header) of zero seconds for a particular pool element handle, or a wildcard pool element handle designated by an asterisk "*" for all registrations. If a pool element handle is already found to exist, then the pool element parameters associated with it are updated.

An application-specific data request may be sent using a data message between a pool element and a pool user. This is mainly to ensure true load balancing across a pool element when multiple clients access the respective ENRP server(s). All IP application packets are encapsulated with ASAP header and sent to a pool element. The pool user's ASAP layer knows which pool element should be used (based on the PE list received from the ENRP server). The ASAP layer provides a set of application program interfaces (API) to the user applications, and both the pool element and the pool user use these API to communicate in the reliable server pool system 100.

An example when one or more ENRP servers leave the server pool is described herein. Considering an example of an existing server pool with four ENRP servers, Table 3 identifies each ENRP server and its corresponding ENRP server to which it operates in the role of caretaker. Although any one or more of the four ENRP servers could leave the server pool, for this example, it is assumed that ENRP-ID=11 and ENRP-ID=4 leave the network at the same time.

TABLE 3

ENRP Server table before ENRP servers leave server pool

| | | |
|---|---|---|
| ENRP-ID=1 | is caretaker to | ENRP-ID=4 |
| ENRP-ID=4 | is caretaker to | ENRP-ID=6 |
| ENRP-ID=6 | is caretaker to | ENRP-ID=7 |
| ENRP-ID=7 | is caretaker to | ENRP-ID=1 |

When ENRP server ENRP-ID=1 and ENRP-ID=4 leave the network server pool, the remaining ENRP servers within the network server pool react accordingly. In the example shown in Table 3, ENRP-ID=7 is expecting a periodic health check message from ENRP-ID=1. ENRP-ID=4 is expecting the message since ENRP-ID=1 is the caretaker ENRP server for ENRP-ID=7. After a certain period of time in not receiving the periodic health check message, ENRP-ID=7 will send out an update message to all other ENRP servers in the pool (ENRP-ID=4 and ENRP-ID=6 in this example) to notify them of the absence/termination/inactivity of ENRP-ID=1. Further, since ENRP-ID=6 is caretaker to ENRP-ID=4, ENRP-ID=6 sends a periodic health check message. In this case, since ENRP-ID=4 has left the server pool, ENRP-ID=6 does not receive a response to its periodic health check message. Thus, ENRP-ID=6 sends an update message to all other ENRP servers in the server pool to notify them of the absence/termination/inactivity of ENRP-ID=4.

In response to the fact that an ENRP server leaves the server pool, a reassignment of caretaker duties occurs. Again, considering an example of an existing server pool with four ENRP servers, Table 3 identifies each ENRP server and its corresponding ENRP server to which it operates in the role of caretaker. Although any one or more of the four ENRP servers could leave the server pool, for this example, it is assumed that ENRP-ID=6 leaves the network server pool. Upon leaving the network server pool, the ENRP servers and their role as caretakers has changed as shown in Table 4. Although ENRP-ID=1 and ENRP-ID=7 continue to act as caretaker to ENRP-ID=4 and ENRP-ID=1 respectively, ENRP-ID=4 is left without an ENRP server to operate for in a caretaker role.

TABLE 4

ENRP Server table after ENRP-ID=6 leaves the server pool

| | | |
|---|---|---|
| ENRP-ID=1 | is caretaker to | ENRP-ID=4 |
| ENRP-ID=4 | is caretaker to | No ENRP server |
| ENRP-ID=7 | is caretaker to | ENRP-ID=1 |

When ENRP-ID=6 leaves the network server pool, the remaining ENRP servers within the network server pool react accordingly. In this example, since ENRP-ID=4 is caretaker to ENRP-ID=6, ENRP-ID=4 sends a periodic health check message. In this case, since ENRP-ID=6 has left the server pool, ENRP-ID=4 does not receive a response to its periodic health check message. Thus, ENRP-ID=4 sends an update message to all other ENRP servers in the server pool to notify them of the absence/termination/inactivity of ENRP-ID=6. Because ENRP-ID=4 generated the update message, ENRP-ID=7 knows that ENRP-ID=4 detected the absence/termination/inactivity of ENRP-ID=6. As such, the role of caretaker for ENRP-ID=4 is reassigned to caretaker for ENRP-ID=7. As such, as shown in Table 5, each server within the server pool now has an ENRP server to act as caretaker to it.

TABLE 5

ENRP Server table after reassignment of caretaker role

| | | |
|---|---|---|
| ENRP-ID=1 | is caretaker to | ENRP-ID=4 |
| ENRP-ID=4 | is caretaker to | ENRP-ID=7 |
| ENRP-ID=7 | is caretaker to | ENRP-ID=1 |

The inventive methods may be embodied as computer readable instructions stored on a computer readable medium such as a floppy disk, CD-ROM, removable storage device, hard disk, system memory, or other data storage medium, and the computer readable instructions may be stored in one or more code modules.

While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

We claim:

1. A method comprising:
    adding a new server to an existing server pool;
    sending a request for registration to a predetermined server;
    receiving from the predetermined server a response with a list of active servers;
    computing a first identification based on the list of active servers;
    assigning the first identification to the new server; and
    determining a caretaker server based on the assigned first identification of the new server.

2. The method of claim 1, further comprising:
    responsive to sending the request for registration, receiving a second response, representative of an authenticated registration, from the predetermined server; and
    sending to the predetermined server a second request to obtain a list of active servers in the pool.

3. The method of claim 2, further comprising:
    sending to a caretaker server a third request for a list of active pool elements; and
    receiving the list of active pool elements from the caretaker server.

4. The method of claim 1, further comprising:
    prior to sending the request for registration to the predetermined server, obtaining a second list of servers; and
    selecting the predetermined server from the second list.

5. The method of claim 4, wherein the second list of servers includes at least one active server.

6. The method of claim 4, wherein the selecting the predetermined server from the second list is arbitrary.

7. The method of claim 1, further comprising the sending an update message indicating that registration is successful.

8. The method of claim 7, wherein the update message includes a notification of a load redistribution that includes the new server.

9. The method of claim 1, wherein the predetermined server is configured to perform an authentication of the first request for registration.

10. The method of claim 1, wherein the request for registration includes an expire time and service policy information.

11. The method of claim 1, wherein the computing the first identification comprises:
   determining the identification values of active servers; and
   computing the first identification as a value different from the identification values of active servers.

12. The method of claim 11, wherein the computing the first identification as a value different from the identification values of active servers comprises:
   determining a highest value identification from the list of active servers; and
   incrementing the highest value identification to obtain the first identification.

13. The method of claim 12, wherein the incrementing the highest value identification to obtain the first identification is by one.

14. The method of claim 1, wherein the determining the caretaker information comprises:
   determining a second identification of a server whose identification value is different from the value of the assigned first identification; and
   defining the determined second identification as the caretaker information.

15. The method of claim 14, wherein the value of the second identification is one less than the value of the assigned first identification.

16. The method of claim 1, further comprising:
   assigning a first active server a role of first caretaker server to the new server; and
   assigning a second active server a role of second caretaker server to a third active server whose corresponding caretaker server was the first active server.

17. The method of claim 1, further comprising:
   receiving from a caretaker server with the determined caretaker information a flag set response representative of a registration failure;
   waiting a period of time;
   computing the first identification a second time;
   assigning the first identification a second time; and
   determining caretaker information a second time.

18. The method of claim 1, further comprising computing a load redistribution that includes the new server.

19. The method of claim 18, further comprising determining a load balancer server.

20. The method of claim 1, further comprising:
   determining whether an event has occurred;
   responsive to the determination that the event has occurred, sending a status message.

21. The method of claim 20, wherein the status message includes an update to the list of active servers.

22. The method of claim 20, wherein the status message includes a health check failure notification.

23. The method of claim 20, wherein the status message includes normal shutdown notification of one of the servers in the pool.

24. The method of claim 20, wherein the status message includes a change to policy and control parameters.

25. The method of claim 20, wherein the event comprises an addition of the new server.

26. The method of claim 20, wherein the event comprises at least one server leaving the pool.

27. The method of claim 1, wherein the new server, the predetermined server, and the active servers are endpoint name resolution protocol servers.

28. A system comprising:
   a first server configured to request registration to join an existing server pool, request from a second server a list of active servers in the existing server pool, compute an identification based on the list of active servers,
   assign the identification to itself,
   determine a caretaker server for itself, and
   request a list of pool elements from the caretaker server;
   wherein the second server is configured to authenticate the registration request from the first server and send the list of active servers to the first server; and
   wherein the caretaker server is configured to send the list of pool elements to the first server.

29. The system of claim 28, wherein the first server is configured to obtain a second list of servers from a network level look-up service and select the second server from the second list of servers.

30. The system of claim 28, wherein the first server is configured to send an update message that the registration is successful.

31. The system of claim 28, wherein the second server and the caretaker server are the same server.

32. The system of claim 28, wherein the registration includes an expire time and service policy information.

33. The system of claim 28, wherein the first server is configured to assume a role of new caretaker server to a third server whose previously corresponding caretaker server was the caretaker server.

34. The system of claim 28, wherein the caretaker server includes a flag representative of a registration failure.

35. The system of claim 34, wherein the first server is configured to receive the flag from the caretaker server, wait a period of time, compute an identification a second time, assign the identification a second time, and determine its caretaker server a second time.

36. The system of claim 28, wherein a load redistribution is computed taking into account the first server.

37. The system of claim 36, wherein the load redistribution is computed by the first server.

38. The system of claim 36, wherein the load redistribution is computed individually by each server in the existing server pool.

39. The system of claim 36, further comprising a load balancer server.

40. The system of claim 39, wherein the load balancer server is the second server.

41. The system of claim 39, wherein the first server is configured to assume the role of the load balancer server.

42. The system of claim 28, wherein the caretaker server is configured to determine whether an event has occurred and to send a status message responsive to the determination that the event has occurred.

43. The system of claim 42, wherein the event is an addition of the first server.

44. The system of claim 42, wherein the event is at least one server leaving the pool.

45. A computer readable storage medium storing computer readable instructions that, when executed by a processor, cause a device to perform:
   obtaining a list of servers;
   selecting a first server from the obtained list;
   sending a first request for registration to the first server;
   receiving a first response, representative of an authenticated registration, from the selected server;

sending a second request to obtain a list of active servers in the existing server pool to the first server;

receiving a second response with the list of active servers from the first server;

computing an identification based upon the active list;

assigning the identification to the device;

determining a caretaker server for the device;

sending a third request for a list of pool elements from the caretaker server;

receiving the list of pool elements from the caretaker server; and sending an update message that registration is successful.

46. An apparatus comprising:

a receiver configured to receive a request for registration from a new server;

a transmitter configured to transmit a response with a list of active servers;

a processor configured to compute a first identification based on the list of active servers;

an assigning unit configured to assign the first identification to the new server; and a determining unit configured to determine a caretaker server based on the assigned first identification of the new server.

47. The apparatus of claim 46, wherein the transmitter is configured to transmit a second response representative of an authenticated registration.

48. The apparatus of claim 46, wherein the transmitter is further configured to transmit an update message indicating that the registration is successful.

49. The apparatus of claim 48, wherein the update message includes a notification of a load redistribution that includes the new server.

50. The apparatus of claim 46, wherein the apparatus is configured to perform an authentication of the request for registration.

51. The apparatus of 46, wherein the request for registration includes an expire time and service policy information.

52. The apparatus of claim 46, wherein the processor is configured to compute the first identification by determining the identification values of active servers and computing the first identification as a value different from the identification values of active servers.

53. The apparatus of claim 46, wherein the determining unit is configured to determine the caretaker server by determining a second identification of a server whose identification value is different from the value of the assigned first identification, and defining the determined second identification as the caretaker information.

54. The apparatus of claim 46, further comprising an assignor configured to assign a first active server a role of first caretaker server to the new server, an d to assign a second active server a role of second caretaker server to a third active server whose corresponding caretaker server was the first active server.

55. The apparatus of claim 46, wherein the apparatus is configured to compute a load redistribution that includes the new server.

56. The apparatus of claim 46, wherein the apparatus comprises an endpoint name resolution protocol server.

* * * * *